J. McCAFFREY.
SHAFT COLLAR.
APPLICATION FILED NOV. 19, 1908.

918,078.  Patented Apr. 13, 1909.

Witnesses:
H. C. Bowser
M. M. Harrington

Inventor:
John McCaffrey
By Henry J. Miller
atty.

UNITED STATES PATENT OFFICE.

JOHN McCAFFREY, OF LAWRENCE, MASSACHUSETTS.

SHAFT-COLLAR.

No. 918,078.   Specification of Letters Patent.   Patented April 13, 1909.

Application filed November 19, 1908. Serial No. 463,405.

*To all whom it may concern:*

Be it known that I, JOHN McCAFFREY, of Lawrence, in the county of Essex and State of Massachusetts, have invented a new and useful Shaft-Collar, of which the following is a specification, reference being had to the accompanying drawings, forming part thereof.

This invention has reference to improvements in shaft collars and particularly to split collars.

The object of the invention is to provide a two part shaft collar which can be economically manufactured and shall be of strong and durable construction and so balanced that it is particularly adapted for use upon high speed shafts while it is capable of being quickly and conveniently applied to a shaft.

The invention consists in the peculiar construction of the parts of the collar and their novel combination as shall hereinafter be more fully described and pointed out in the claims.

Figure 1:
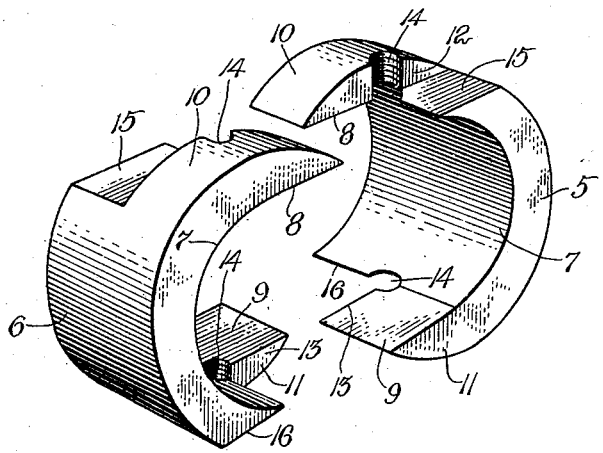
Figure 2:
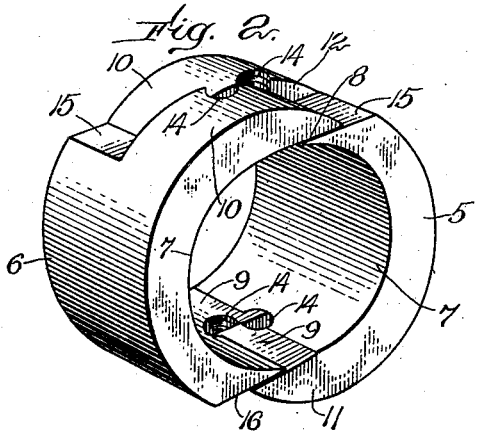
Figure 3:
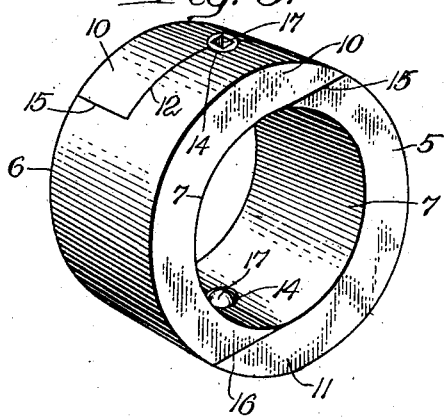

Figure 1, represents an isometrical view of the parts of the collar in separated positions, the securing devices being omitted. Fig. 2, represents a similar view of the same parts in partially closed position. Fig. 3, represents a similar view of the complete collar the parts of which are brought together and secured from separation by the set screws designed to engage the shaft to which the collar is designed to be applied.

Similar numbers of reference designate corresponding parts throughout.

As shown in the drawings in its preferred form the improved collar is formed in two essentially similar parts which will however, for the purposes of description, be herein referred to by the different numerals of reference 5 and 6. Each of said collar sections 5 and 6 comprises the inner wall 7 which is shaped to conform to a peripheral portion of the shaft to which the collar is designed to be secured. In the present instance the wall 7 is approximately semicircular and its end portions are intersected by the flat faces 8 and 9 of the offset arms 10 and 11 which arms have the shoulders 12 and 13 preferably extending at an angle with the axis of the collar and furnished with the semicircular screw threaded recesses 14—14 or key ways. At the sides of the arms 10 and 11 are formed the faces 15 and 16 which extend in planes parallel to the respective faces 8 and 9 of said arms 10 and 11.

By reason of this construction, when the members 5 and 6 are brought together, as shown in Figs. 2 and 3, the faces 8—8 and 9—9 of the respective arms 10—10 and 11—11 slide over the faces 15—15 and 16—16 until the related complemental recesses 14—14 register, as shown in Fig. 3, at which time the separation of said members 5 and 6 in the direction of the axis of the collar is prevented by the shoulders 12—12 and 13—13 of the respective arms 10—10 and 11—11. To prevent the diametrical separation of such members 5 and 6 set screws 17—17 or keys are now screwed into the screw threaded perforations formed by the combined registered recesses 14—14 and, if the collar be thus mounted on a shaft, said screws 17—17 set against said shaft and prevent the rotation of the collar independently of said shaft and, it is to be noted that, the thrust of the set screws 17—17 against the shaft would be resisted by the bearing of said screws in said recesses 14—14 for the full thickness of the collar.

The periphery of the collar, when the members 5 and 6 are assembled as described above, is preferably of cylindrical shape but this shape may be modified without departing from the spirit of this invention.

The construction of the collar is obviously simple and economical and the collar is strong and durable and its members 5 and 6 cannot be separated without the complete shearing of both of the screws 17—17. If, therefore, one of the screws 17—17 should become loosened and fall out the parts of the collar would still be held together and fixed on the shaft by the other of said screws; this however, is an eventuality which is not likely to happen.

Having thus described my invention, I claim as new and desire to secure by Letters Patent—

1. A split collar comprising separable members of similar shape having overlapping projections adapted to prevent the independent movement of said members in the direction of the axis of the collar, and means located between the adjacent faces of said projections for preventing diametrical separation of said members.

2. A split collar comprising two complemental members each having a pair of offset projections with parallel flat inner faces and a pair of offset parallel faces adapted to register with the faces of said projections, and radially extending securing means located between said pairs of projections.

3. A split collar comprising two members each having a pair of offset projections having parallel inner surfaces and sides extending at angles with the axis of the collar furnished with complemental screw threaded recesses and defining parallel flat surfaces formed in the walls of said members, and set screws adapted to be screwed into said screw threaded recesses when combined, substantially as described.

JOHN McCAFFREY.

Witnesses:
James G. Dowd,
Helen V. Fleming.